United States Patent
Locher et al.

(10) Patent No.: US 9,350,212 B2
(45) Date of Patent: May 24, 2016

(54) MECHANICAL METAL-FORMING MACHINE HAVING A FLYWHEEL COUPLED TO A ROTOR OF AN AUXILIARY DRIVE AND METHOD FOR PROVIDING THE MECHANICAL METAL-FORMING MACHINE

(71) Applicant: Schuler Pressen GmbH, Göppingen (DE)

(72) Inventors: Martin Locher, Schlier (DE); Reinhold Gasser, Riedhausen (DE)

(73) Assignee: Schuler Pressen GmbH, Goppingen (DE)

( * ) Notice: Subject to any disclaimer, the term of this patent is extended or adjusted under 35 U.S.C. 154(b) by 422 days.

(21) Appl. No.: 13/865,296

(22) Filed: Apr. 18, 2013

(65) Prior Publication Data

US 2013/0264901 A1    Oct. 10, 2013

Related U.S. Application Data

(63) Continuation of application No. PCT/EP2011/005416, filed on Oct. 27, 2011.

(30) Foreign Application Priority Data

Oct. 27, 2010    (DE) .................. 10 2010 049 492

(51) Int. Cl.
*H02K 7/02* (2006.01)
*B30B 1/26* (2006.01)
*B30B 15/10* (2006.01)
*B30B 15/12* (2006.01)

(52) U.S. Cl.
CPC *H02K 7/02* (2013.01); *B30B 1/266* (2013.01); *B30B 15/10* (2013.01); *B30B 15/12* (2013.01)

(58) Field of Classification Search
CPC ......... H02K 7/02; H02K 7/025; H02K 7/003; H02K 7/10; H02K 7/102
USPC ......................... 310/74, 75 R, 76–78, 92–98
See application file for complete search history.

(56) References Cited

U.S. PATENT DOCUMENTS 5,855,255 A * 1/1999 Bock .................... H02K 7/1021
                                                        188/156
2002/0077207 A1* 6/2002 Fahbenbach ...................... 475/5

FOREIGN PATENT DOCUMENTS

DE            629 792 C     4/1936
DE    20 2006 013 502 U1   1/2008

(Continued)

OTHER PUBLICATIONS

International Search Report and Written Opinion dated Jan. 27, 2012.

*Primary Examiner* — Michael Andrews
(74) *Attorney, Agent, or Firm* — Burr & Brown, PLLC

(57) ABSTRACT

The invention relates to a mechanical metal-forming machine which comprises a drive shaft, a flywheel drive with a flywheel, an auxiliary drive and a coupling, wherein the flywheel drive drives the metal-forming machine at least intermittently, wherein the flywheel is coupled for this purpose to the drive shaft via the coupling and wherein the auxiliary drive is designed as a servo motor and drives the drive shaft. A rotor of the auxiliary drive is permanently connected to the drive shaft in a torque-proof manner for this purpose and the flywheel is coupled to the rotor of the auxiliary drive by means of the coupling for this purpose, in order to drive the drive shaft via said rotor.

8 Claims, 3 Drawing Sheets

(56) References Cited

FOREIGN PATENT DOCUMENTS

| | | |
|---|---|---|
| DE | 10 2008 064 229 A1 | 7/2010 |
| EP | 1 126 581 A2 | 8/2001 |
| EP | 1 640 145 A1 | 3/2006 |
| EP | 2 006 080 A1 | 12/2008 |
| EP | 2 199 072 A2 | 6/2010 |
| WO | 2008/149171 A1 | 12/2008 |
| WO | 2010/063329 A1 | 6/2010 |

* cited by examiner

MECHANICAL METAL-FORMING MACHINE HAVING A FLYWHEEL COUPLED TO A ROTOR OF AN AUXILIARY DRIVE AND METHOD FOR PROVIDING THE MECHANICAL METAL-FORMING MACHINE

CROSS REFERENCE TO RELATED APPLICATIONS

This application is a continuation of International Application No. PCT/EP2011/005416 filed Oct. 27, 2011, which designated the United States, and claims the benefit under 35 USC §119(a)-(d) of German Application No. 10 2010 049 492.5 filed Oct. 27, 2010, the entireties of which are incorporated herein by reference.

FIELD OF THE INVENTION

The invention relates to a mechanical metal-forming machine, particularly a crank press, and a method for producing a mechanical metal-forming machine.

BACKGROUND OF THE INVENTION

A mechanical metal-forming machine is disclosed in DE 10 2008 064 229 A1, which comprises a drive shaft, a main drive, an auxiliary drive, a flywheel and a coupling, wherein the main drive drives the flywheel intermittently, wherein the flywheel is coupled for this purpose to the drive shaft via the coupling and wherein the auxiliary drive is designed as a servo motor and drives the drive shaft.

SUMMARY OF THE INVENTION

The problem addressed by the invention is that of proposing a mechanical metal-forming machine, particularly a crank press, which works in an energy-efficient manner and in which the drive components are arranged in space-saving manner, thereby particularly enabling an existing metal-forming machine to be modified or retrofitted with little effort or expense. Furthermore, a problem addressed by the invention is that of proposing a method by which an existing metal-forming machine can be modified to exhibit the advantages of a metal-forming machine according to the invention.

The mechanical metal-forming machine according to the present invention, in particular the crank press, comprises a drive shaft, a flywheel drive with a flywheel, an auxiliary drive and a coupling, wherein the flywheel drive drives the metal-forming machine at least intermittently, wherein the flywheel is coupled for this purpose to the drive shaft via the coupling and wherein the auxiliary drive is designed as a servo motor and drives the drive shaft. The invention is characterized in that a rotor of the auxiliary drive is permanently connected to the drive shaft in a torque-proof manner and that the flywheel is coupled to the rotor of the auxiliary drive by means of the coupling, in order to drive the drive shaft via the rotor.

The transmission of rotational energy from the flywheel via a coupling action to the rotor of an auxiliary drive, which is in turn permanently connected to the drive shaft of the metal-forming machine, means that a separate coupling device for the two drive possibilities existing side-by-side can be dispensed with due to the flywheel and/or the auxiliary drive. By way of example, the arrangement could be such that the auxiliary drive is inserted between the flywheel and the drive shaft and intermittently takes over the transmission of force via its rotor.

In an advantageous development of the metal-forming machine according to the present invention, the flywheel drive and also the auxiliary drive are arranged at the same end of the drive shaft. In this way, a compact drive subassembly is formed, which is easily accessible for maintenance and renewal purposes, for example.

A further practical embodiment of the present invention provides that the auxiliary drive may be configured either as a stator with an internal rotor or as a stator with an external rotor. Depending on the design requirements in each case, corresponding possible variations may provide advantageous couplings on the drive shaft.

In a further practical embodiment of the metal-forming machine according to the present invention, it is provided that the coupling comprises at least one actuating cylinder, wherein the at least one actuating cylinder is stationary in relation to the flywheel. The stationary arrangement of the actuating cylinder for the coupling, wherein a plurality of actuating cylinders is usually realized, means that a complex and delicate rotary inlet can be dispensed with.

In a further practical embodiment of the metal-forming machine according to the present invention, it is provided that a braking device, particularly a hydraulic drum brake, acts on a rotor carrier supporting the rotor radially starting from the drive shaft from within. An arrangement of this kind of a braking device facilitates a compact, modular design, which can be advantageously integrated into the drive subassembly.

By using a corresponding drive subassembly, which is formed from a coupling unit, a direct drive—auxiliary drive—as the servo motor and a braking device, it is possible for existing metal-forming machines with a flywheel drive to be modified, so that in this way the advantages of combining a flywheel drive and a direct drive can be exploited. The corresponding advantages are, among other things, that the tappet movement is not determined exclusively by a flywheel movement, but a dwell time which can be selected independently of the speed of the flywheel in the upper dead center or movement ramps of the tappet can be started by the direct drive.

The present invention further relates to a method for providing a mechanical metal-forming machine, which describes the modification of an existing metal-forming machine through the installation of a drive subassembly.

BRIEF DESCRIPTION OF THE DRAWINGS

The key data relating to the invention are to be explained in greater detail with the help of the following exemplary embodiments.

DETAILED DESCRIPTION OF THE INVENTION

Figure 1:
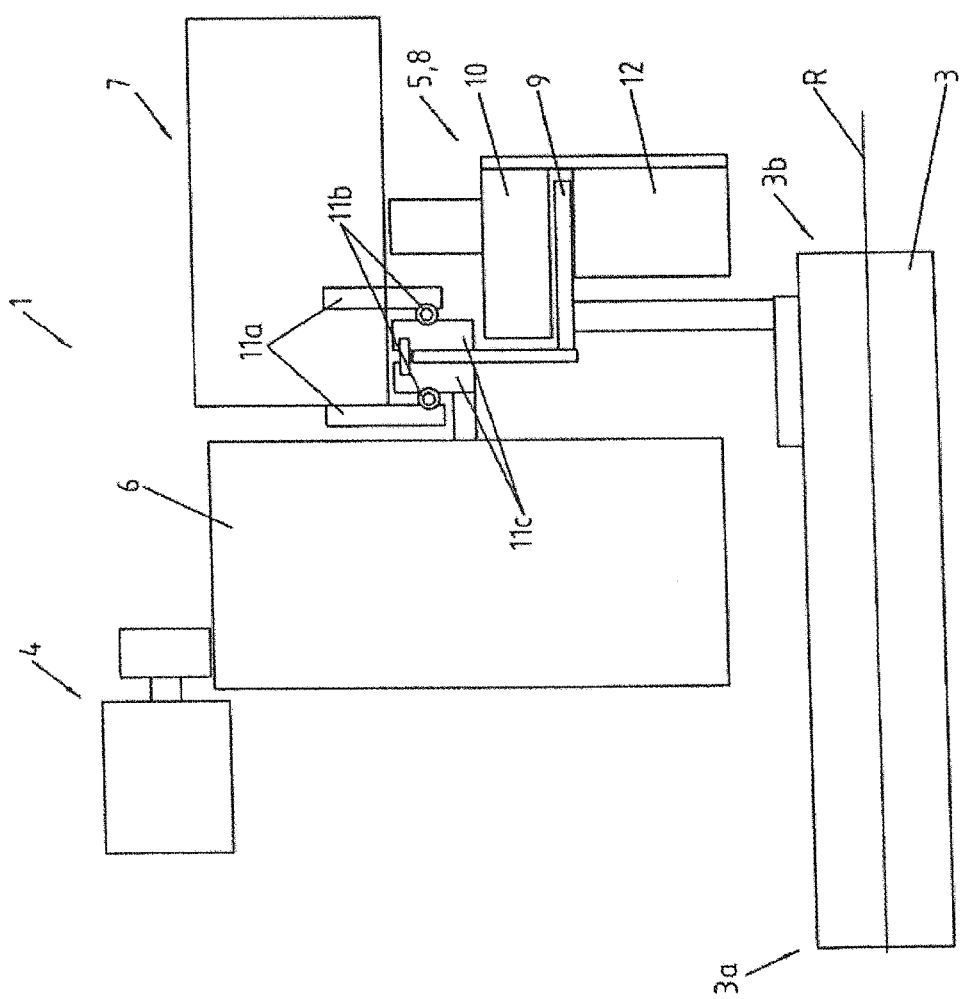
FIG. 1 shows a schematic sectional view of the upper half-space of a corresponding drive section of a metal-forming machine.

In detail, FIG. 1 shows a detail of the upper half-space above the rotational axis R of a drive arrangement for a mechanical metal-forming machine 1. The metal-forming machine 1 in this case comprises a drive shaft 3, a flywheel 6 with a flywheel drive 4, an auxiliary drive 5 and a coupling 7. The auxiliary drive 5 is designed as a servo motor 8 in this case, which comprises a rotor 9 and a stator 10. The rotor 9 in this case is permanently connected in a torque-proof manner to the drive shaft 3. The rotor 9 furthermore comprises a friction disc 9a, which can be connected via the coupling 7 and the pressure discs 11a arranged thereon, pressure bearings 11b and friction discs 11c to the flywheel 6. In this way, the flywheel 6 is coupled to the rotor 9 of the auxiliary drive 5 by means of the coupling 7, in order to drive the drive shaft 3 via said rotor 9.

Lying radially inwards between the rotational axis R of the drive shaft 3 and the rotor 9 is a braking device 12, which is only depicted schematically in the present case. The drive shaft 3 exhibits a first end 3a and a second end 3b. The flywheel drive 4 and the auxiliary drive 5 are arranged at the same end 3b of the drive shaft 3. In other words, the flywheel drive 4 and the auxiliary drive 5 act on the same end 3b of the drive shaft 3 via the rotor 9 of the auxiliary drive 5.

Figure 2:
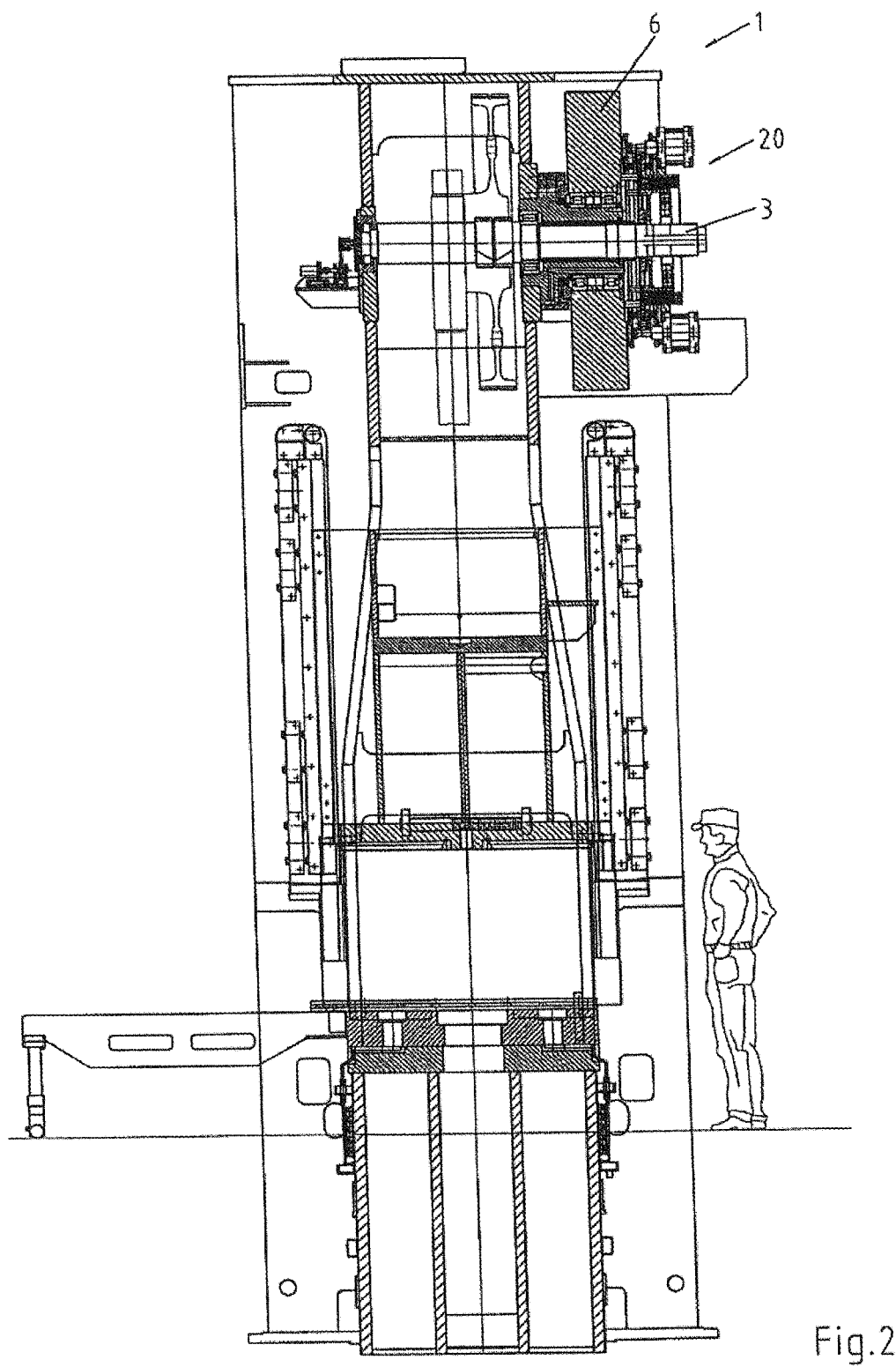
FIG. 2 shows a sectional view of a metal-forming machine with the drive in place.

FIG. 2 shows a mechanical metal-forming machine 1 depicted as a crank press 2, which exhibits a drive arrangement according to the invention in its upper drive portion. Arranged around the drive shaft 3 in this case is the flywheel 6, which represents the flywheel drive for the metal-forming machine in the coupled state. A drive subassembly 20, which may be attached to available fixing means in an existing machine replaces an available coupling and brake arrangement where an existing mechanical metal-forming machine is retrofitted.

Figure 3:
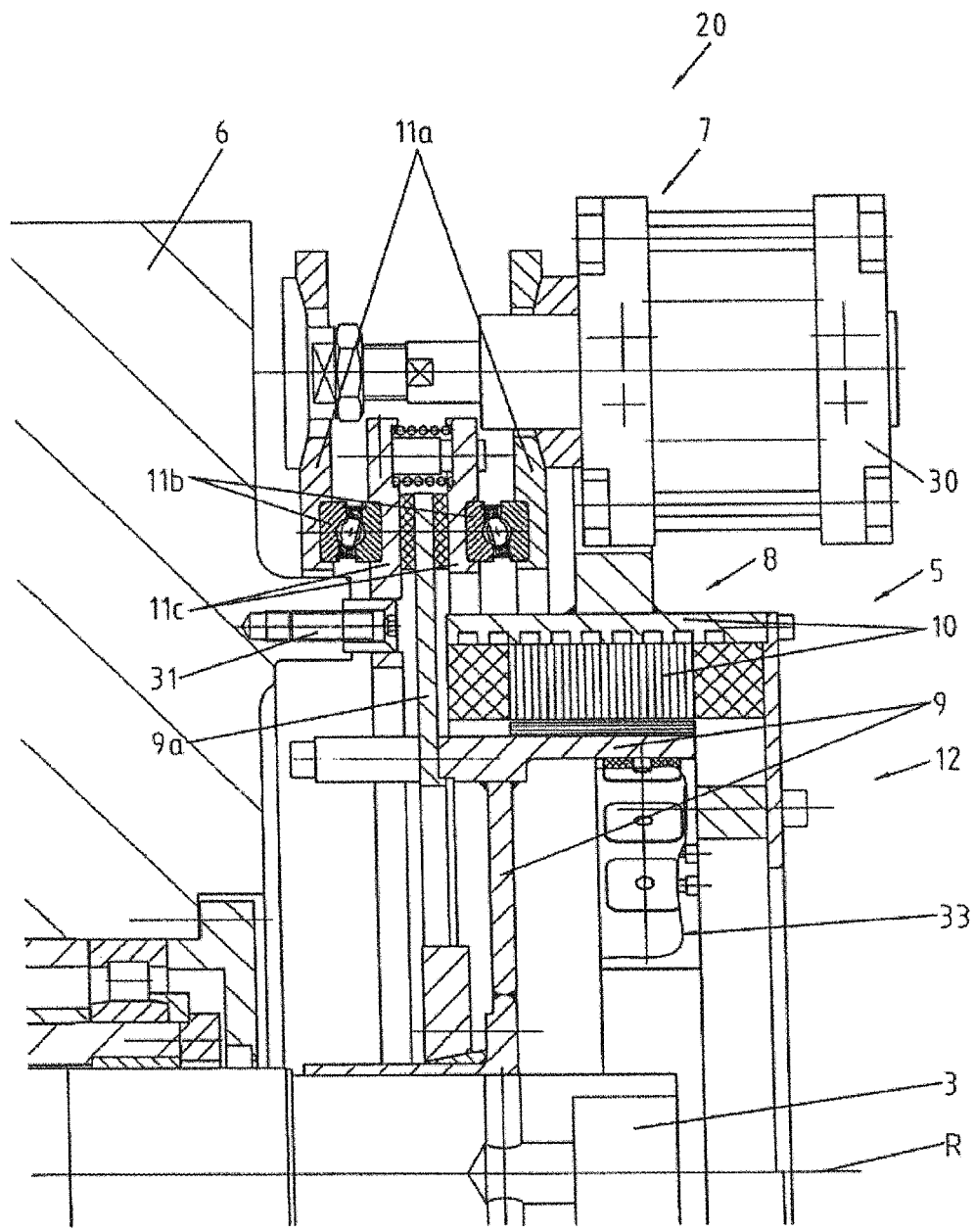
FIG. 3 shows a detail view of the metal-forming machine according to FIG. 2.

To assist with understanding, the drive subassembly 20 in FIG. 3 is depicted in an enlarged view.

FIG. 3 shows a corresponding sectional view of the upper half-space of the drive shaft 3 in this case, as has already been depicted schematically in FIG. 1. The servo motor 8 in this case comprises the rotor 9, which is connected to the drive shaft 3 in a torque-proof manner, and also the stator 10. The coupling 7 with the actuating cylinders 30 disposed therein may connect the friction disc 9a to the flywheel 6, so that the flywheel drives the drive shaft 3 via the rotor 9. The drive subassembly 20 in this case is secured to the flywheel 6 or to the machine via fixing means, for example via the attachment 31, which already exist in the case of a modified machine, for example. The drum brake 33 is arranged between the drive shaft 3 and the rotor 9 and through its function as a braking device exerts a braking force on the rotor 9 internally.

In addition to the control of the auxiliary drive 5, it may be provided that a sensor-free operation of the servo motor is made possible using suitable means.

The invention is not, however, restricted to the exemplary embodiment shown; instead, it covers all those embodiments that make use of the basic idea underlying the invention.

REFERENCE NUMBER LIST

1 Metal-forming machine
2 Crank press
3 Drive shaft
3a First end
3b Second end
4 Flywheel drive
5 Auxiliary drive
6 Flywheel
7 Coupling
8 Servo motor
9 Rotor
9a Friction disc
10 Stator
11a Pressure disc
11b Pressure bearing
11c Friction disc
12 Braking device
20 Drive subassembly
30 Actuating cylinder
31 Fixing means
33 Drum brake
R Rotational axis of 3

We claim:

1. A mechanical metal-forming machine comprising:
a drive shaft,
a flywheel drive with a flywheel,
an auxiliary drive comprising a rotor,
a coupling,
wherein the flywheel drive drives the metal-forming machine at least intermittently,
wherein the flywheel is coupled for this purpose to the drive shaft via the coupling, and
wherein the auxiliary drive is designed as a servo motor and drives the drive shaft, wherein the rotor of the auxiliary drive is permanently connected to the drive shaft in a torque-proof manner and the flywheel is directly coupled to the rotor of the auxiliary drive by means of the coupling, in order to drive the drive shaft via the rotor.

2. The mechanical metal-forming machine as claimed in claim 1, wherein the drive shaft has a first end and a second end, wherein the flywheel drive and the auxiliary drive are arranged at the same end of the drive shaft.

3. The mechanical metal-forming machine as claimed in claim 1, wherein the rotor of the auxiliary drive drives the drive shaft directly without a coupling being inserted and the rotor is thereby configured internally in a stator.

4. The mechanical metal-forming machine as claimed in claim 1, wherein the rotor of the auxiliary drive drives the drive shaft directly without a coupling being inserted and the rotor is thereby configured externally in a stator.

5. The mechanical metal-forming machine as claimed in claim 1, wherein the coupling comprises at least one actuating cylinder, wherein the at least one actuating cylinder is stationary in relation to the flywheel.

6. The mechanical metal-forming machine as claimed in claim 1, further comprising a braking device, wherein the braking device acts on a rotor carrier supporting the rotor radially starting from the drive shaft from within.

7. A method for providing a mechanical metal-forming machine as claimed in claim 6, wherein in a first process step on an existing metal-forming machine, an existing coupling and brake arrangement are dismantled from a drive shaft while retaining at least one existing fixing means on the metal-forming machine, and
in a second process step a subassembly comprising the auxiliary drive, the coupling and the braking device is attached, wherein the subassembly is attached to at least one existing fixing means and the rotor of the auxiliary drive is directly and permanently connected to the drive shaft in a torque-proof manner.

8. The mechanical metal-forming machine as claimed in claim 6, wherein the braking device is a hydraulic drum brake.

* * * * *